(12) United States Patent
Liu

(10) Patent No.: US 12,070,979 B2
(45) Date of Patent: Aug. 27, 2024

(54) SUSPENSION STRUCTURE AND VEHICLE

(71) Applicant: CONTEMPORARY AMPEREX TECHNOLOGY CO., LIMITED, Ningde (CN)

(72) Inventor: Shuai Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/328,782

(22) Filed: Jun. 5, 2023

(65) Prior Publication Data
US 2023/0311601 A1 Oct. 5, 2023

Related U.S. Application Data

(63) Continuation of application No. PCT/CN2022/104233, filed on Jul. 6, 2022.

(30) Foreign Application Priority Data

Sep. 29, 2021 (CN) .......................... 202122384667.4

(51) Int. Cl.
*B60G 11/08* (2006.01)
*B60G 7/00* (2006.01)
(Continued)

(52) U.S. Cl.
CPC .............. *B60G 11/08* (2013.01); *B60G 7/005* (2013.01); *B60G 11/125* (2013.01); *B62D 7/18* (2013.01);
(Continued)

(58) Field of Classification Search
CPC .................................................. B60G 11/08
See application file for complete search history.

(56) References Cited

U.S. PATENT DOCUMENTS

| 1,333,976 A | * | 3/1920 | Harris | B60G 11/125 |
| | | | | 267/265 |
| 1,993,986 A | * | 3/1935 | Alley | B60G 11/08 |
| | | | | 267/52 |

(Continued)

FOREIGN PATENT DOCUMENTS

| CN | 204526704 U | * | 8/2015 |
| CN | 207657538 U | | 7/2018 |

(Continued)

OTHER PUBLICATIONS

International Search Report received in the corresponding International Application PCT/CN2022/104233, mailed Sep. 20, 2022.

(Continued)

*Primary Examiner* — Amy R Weisberg
*Assistant Examiner* — Shams Dhanani
(74) *Attorney, Agent, or Firm* — KILPATRICK TOWNSEND & STOCKTON LLP

(57) ABSTRACT

Various embodiments provide a suspension structure and a vehicle, and relates to the field of vehicle technologies. In some embodiments, the suspension structure includes a leaf spring assembly, an upper arm, a steering knuckle, and a shock absorber. The leaf spring assembly includes two leaf spring constructions arranged in a front-to-rear direction. Both leaf spring constructions are arranged transversely relative to a body structure, and the middle part of each leaf spring construction is fixedly connected to the body structure; and each of the leaf spring constructions is provided with two free ends in a length direction, and each of the free ends is provided with a first mounting portion and a second mounting portion. One end of the upper arm is rotatably connected to the body structure.

15 Claims, 5 Drawing Sheets

(51) Int. Cl.
  *B60G 11/12* (2006.01)
  *B62D 7/18* (2006.01)
(52) U.S. Cl.
  CPC .... *B60G 2200/14* (2013.01); *B60G 2202/114* (2013.01); *B60G 2204/121* (2013.01); *B60G 2204/128* (2013.01); *B60G 2204/148* (2013.01); *B60G 2204/416* (2013.01)

(56) References Cited

U.S. PATENT DOCUMENTS

| | | | | |
|---|---|---|---|---|
| 2,202,918 | A * | 6/1940 | Peo | B60G 11/08 267/230 |
| 2,206,970 | A * | 7/1940 | Megow | B60G 11/08 180/41 |
| 2,496,906 | A * | 2/1950 | Churchill | B60G 11/38 267/230 |
| 3,157,395 | A * | 11/1964 | Budzynski | B60G 11/08 180/257 |
| 3,204,717 | A * | 9/1965 | Collins | B60G 11/08 180/300 |
| 4,146,103 | A * | 3/1979 | Walter | B60K 17/34 180/234 |
| 4,422,666 | A * | 12/1983 | Proctor | B60G 17/023 280/124.171 |
| 4,614,359 | A * | 9/1986 | Lundin | B60G 3/205 280/124.144 |
| 4,779,893 | A * | 10/1988 | Juechter | B60G 15/06 280/124.148 |
| 4,854,606 | A * | 8/1989 | de Goncourt | B60G 11/08 280/124.171 |
| 4,887,841 | A * | 12/1989 | Cowburn | B60G 11/08 280/124.171 |
| 5,062,620 | A * | 11/1991 | Martone | B60G 11/10 267/260 |
| 5,401,049 | A * | 3/1995 | Richardson | B60G 5/043 280/124.17 |
| 5,636,857 | A * | 6/1997 | Tandy, Jr. | B60G 21/05 267/31 |
| 11,597,246 | B1 * | 3/2023 | Klein | B60G 11/465 |
| 11,850,903 | B1 * | 12/2023 | Kim | B60G 17/015 |
| 2005/0253351 | A1 * | 11/2005 | Pan | B60G 11/113 280/124.116 |
| 2006/0046826 | A1 * | 3/2006 | Gilmartin | B60G 11/36 463/19 |
| 2007/0013160 | A1 * | 1/2007 | Richardson | B60G 11/465 280/124.165 |
| 2008/0290623 | A1 * | 11/2008 | Lundmark | B60G 21/026 280/124.152 |
| 2010/0038877 | A1 * | 2/2010 | Cortez | B60G 11/113 280/124.175 |
| 2010/0276901 | A1 * | 11/2010 | Richardson | B60G 11/465 280/93.512 |
| 2011/0285103 | A1 * | 11/2011 | Louden | B60G 11/00 280/124.165 |
| 2012/0146309 | A1 * | 6/2012 | Fruhmann | B60G 21/026 280/124.175 |
| 2014/0327196 | A1 * | 11/2014 | Hummelt | B60G 11/08 267/52 |
| 2015/0102575 | A1 * | 4/2015 | Lake | B60G 11/10 280/124.171 |
| 2016/0297266 | A1 * | 10/2016 | Hinz | B60G 3/06 |
| 2019/0283522 | A1 * | 9/2019 | Battaglia | B60G 21/005 |
| 2019/0359022 | A1 * | 11/2019 | Patel | B60G 11/10 |
| 2019/0359256 | A1 * | 11/2019 | Karlsson | B62D 7/18 |
| 2020/0017142 | A1 * | 1/2020 | Buchwitz | B60G 3/202 |
| 2020/0247207 | A1 * | 8/2020 | Dhaens | B60G 11/34 |
| 2020/0353785 | A1 * | 11/2020 | Cho | B60G 11/04 |
| 2021/0162826 | A1 * | 6/2021 | Senoo | B60G 11/10 |
| 2021/0316586 | A1 * | 10/2021 | Stoychev | B60G 9/003 |
| 2023/0311601 | A1 * | 10/2023 | Liu | B60G 11/08 |
| 2023/0356781 | A1 * | 11/2023 | Sun | B62D 3/12 |

FOREIGN PATENT DOCUMENTS

| | | | |
|---|---|---|---|
| CN | 213920580 U | * | 8/2021 |
| CN | 216184315 U | | 4/2022 |

OTHER PUBLICATIONS

Written Opinion received in the corresponding International Application PCT/CN2022/104233, mailed Sep. 20, 2022.

Notice of Granting Priority Right of Utility Model Patent Right received in the corresponding Chinese Application 202122384667.4, mailed Mar. 14, 2022.

\* cited by examiner

SUSPENSION STRUCTURE AND VEHICLE

CROSS-REFERENCE TO RELATED APPLICATIONS

This application is a continuation of International Application PCT/CN2022/104233, filed Jul. 6, 2022, which claims priority to Chinese patent application No. 202122384667.4, filed on Sep. 29, 2021 and entitled "SUSPENSION STRUCTURE AND VEHICLE", which is incorporated herein by reference in its entirety.

TECHNICAL FIELD

This application relates to the field of vehicle technologies, in particular, to a suspension structure and a vehicle.

BACKGROUND

Suspension structure is a general term for all force-transferring connection means between a chassis and wheels of a vehicle, used to transfer forces and torques between the chassis and wheels, buffer the impact load transferred from irregularities in a road surface to the chassis, and attenuate the body vibration caused by the road impact, so as to ensure smooth driving of the vehicle. Traditional suspension structures include elastic elements, guide mechanisms, shock absorbers, and the like, and some also include buffer blocks, stabilizer bars, and the like. The elastic elements are typically springs, leaf springs, and the like. An elastic element of the leaf spring type generally includes a group of leaf springs. A suspension structure including one leaf spring construction as in the prior art has weak connection strength and is easy to break under an external impact. In addition, a suspension structure including only one group of leaf springs has poor stability, so a vehicle's body is easy to shake when the vehicle jolts. Therefore, how the connection strength and stability of a suspension structure are improved has become an urgent problem to be solved.

SUMMARY

This application provides a suspension structure and is intended to improve the connection strength and stability of the suspension structure.

A first aspect of this application provides a suspension structure, including a leaf spring assembly, an upper arm, a steering knuckle, and a shock absorber. The leaf spring assembly includes two leaf spring constructions arranged in a front-to-rear direction. Both leaf spring constructions are arranged transversely relative to a body structure, and the middle part of each leaf spring construction is fixedly connected to the body structure. Each of the leaf spring constructions is provided with two free ends in a length direction, and each of the free ends is provided with a first mounting portion and a second mounting portion. One end of the upper arm is rotatably connected to the body structure. An upper end of the steering knuckle is connected to the other end of the upper arm via a first connecting mechanism; and a lower end of the steering knuckle is connected to the first mounting portions of the two leaf spring constructions via a second connecting mechanism. An upper end of the shock absorber is connected to the body structure; and a lower end of the shock absorber is connected to the second mounting portions of the two leaf spring constructions via a third connecting mechanism. The leaf spring assembly includes two leaf spring constructions arranged in a front-to-rear direction, so connection strength of the entire suspension structure can be improved. In addition, the shock absorber is connected between the two leaf spring constructions and arranged on a bouncing central line of wheels, allowing the shock absorber to handle even force and effectively absorb shocks, thereby improving the stability of the suspension.

In some embodiments, the first mounting portion includes a first lifting eye; and the second connecting mechanism includes a first shaft and a first ball joint mechanism. Two ends of the first shaft are hinged to the first lifting eyes of the two leaf spring constructions. The first ball joint mechanism is connected to the middle part of the first shaft and the lower end of the steering knuckle. The first mounting portion designed with the first lifting eye facilitates hinging to the first shaft and implements rotatable connection to the steering knuckle. The first ball joint mechanism can further expand the rotational range of the steering knuckle.

In some embodiments, the second mounting portion includes a second lifting eye; and the third connecting structure includes a second shaft. Two ends of the second shaft are hinged to the second lifting eyes of the two leaf spring constructions; and the lower end of the shock absorber is connected to the middle part of the second shaft. The second mounting portion designed with the second lifting eye facilitates hinging to the second shaft and implements rotatable connection to the shock absorber. The shock absorber is connected to the middle part of the second shaft so that the shock absorber is located on the bouncing central line of wheels.

In some embodiments, the first ball joint mechanism includes a ball joint base and a ball joint rod. The ball joint base is disposed at the middle part of the first shaft, the ball joint rod rotatably fits with the ball joint base, and the ball joint rod is connected to the lower end of the steering knuckle. The first ball joint mechanism can enable the steering knuckle to move up and down along with the leaf spring construction and rotate with respect to the leaf spring construction.

In some embodiments, a ball center of the ball joint rod is on an axis of the first shaft so that a rotation center of the ball joint rod is on the axis of the first shaft. This not only ensures a rotation function of the first ball joint mechanism but also helps reduce the size of the steering knuckle in a vertical direction and reduce the weight of the steering knuckle, implementing a lightweight design for the steering knuckle.

In some embodiments, the two leaf spring constructions are provided symmetrically with respect to an intermediate plane, and an axis of the shock absorber is located on the intermediate plane. When the shock absorber is under force, it can directly act on the bouncing center of the wheels, resulting in a more significant shock absorption effect. This also prevents the shock absorber from withstanding torque bias, reducing wear of the shock absorber and prolonging service life of the shock absorber.

In some embodiments, the leaf spring assembly further includes a "U-shaped" bolt configured to connect the middle part of the leaf spring construction to the body structure. The "U-shaped" bolt has a simple and lightweight structure that makes it easy to fasten the leaf spring construction.

In some embodiments, the leaf spring assembly further includes a reinforcement plate. The reinforcement plate is disposed under two leaf spring constructions and is configured to support the two leaf spring constructions. The reinforcement plate is connected to the body structure via the "U-shaped" bolt. The reinforcement plate can improve the connection strength and the stability of the leaf spring assembly, further increasing a load capacity of the suspension structure. The reinforcement plate fits with the "U-shaped" bolt, implementing a tighter connection between the leaf spring assembly and the body structure.

In some embodiments, the leaf spring construction includes at least two leaf springs, a leaf spring connecting component, two first mounting portions, and two second mounting portions. The at least two leaf springs are stacked along the vertical direction. The at least two leaf springs decrease in length gradually from the bottom upwards. The at least two leaf springs include a first leaf spring and a second leaf spring. Length of the first leaf spring is greater than length of the second leaf spring. The leaf spring connecting component is configured to fixedly connect body portions of the at least two leaf springs in the length direction. The two first mounting portions are respectively disposed on two first free ends of the first leaf spring in the length direction. The two second mounting portions are respectively disposed on two second free ends of the second leaf spring in the length direction. The leaf spring construction includes at least two leaf springs, which improves the connection strength and durability of the leaf spring construction and prolongs service life of the leaf spring construction. The first leaf spring and the second leaf spring each are provided with two mounting portions, which can provide mounting space for the steering knuckle and the shock absorber, thereby improving utilization of the mounting space of the vehicle.

In some embodiments, the first leaf spring is disposed at the lowest part of the leaf spring construction, facilitating the arrangement of two first mounting portions at two first free ends of the first leaf spring in the length direction and allowing the first leaf spring to support from the lowest part other leaf springs and other components.

In some embodiments, the second leaf spring is located above the first leaf spring. Because length of the first spring is greater than length of the second leaf spring, the second leaf spring is located above the first leaf spring. In this way, two second mounting portions can be disposed at the two second free ends of the second leaf spring.

In some embodiments, the second leaf spring and the first leaf spring are adjacent or spaced apart, so distance between the two first free ends and the two second free ends in the vertical direction can be flexibly adjusted, thereby more flexibly satisfying a mounting space requirement for the steering knuckle, the shock absorber, and other components.

In some embodiments, in the length direction, the two second mounting portions are located between the two first mounting portions, so the first mounting portion and the second mounting portion can be staggered from each other to avoid interference between connecting components during the mounting and facilitating the mounting of the steering knuckle, the shock absorber, and other components.

According to a second aspect of this application, a vehicle is provided, including the suspension structure provided in the first aspect of this application. For the vehicle in this application, on the one hand, connection strength and stability of the suspension structure of the vehicle can be significantly improved; on the other hand, a steering knuckle and a shock absorber in the vehicle are disposed between two leaf spring constructions, which can reduce the number of connected components and facilitate steering of wheels, providing a more significant shock absorption effect.

In some embodiments, the body structure is a vehicle body and/or a sub-chassis connected to the suspension structure in this application, which can enhance stability and comfort of the vehicle, and reduce wear of the shock absorber to improve reliability and prolong a service life of the vehicle.

The suspension structure provided in the first aspect of this application includes a leaf spring assembly, an upper arm, a steering knuckle, and a shock absorber. The leaf spring assembly includes two leaf spring constructions arranged in a front-to-rear direction. This provides a mounting space for the steering knuckle, the shock absorber, or other components, reduces the number of connected components, and can further improve the connection strength of the leaf spring assembly. The shock absorber is disposed on a bouncing central line of wheels, providing a more significant shock absorption effect, so as to improve the stability of the suspension structure. Therefore, the suspension structure in this application can improve the connection strength and the stability of the suspension structure.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and persons of ordinary skill in the art may still derive other drawings from the accompanying drawings without creative efforts.

Figure 1:
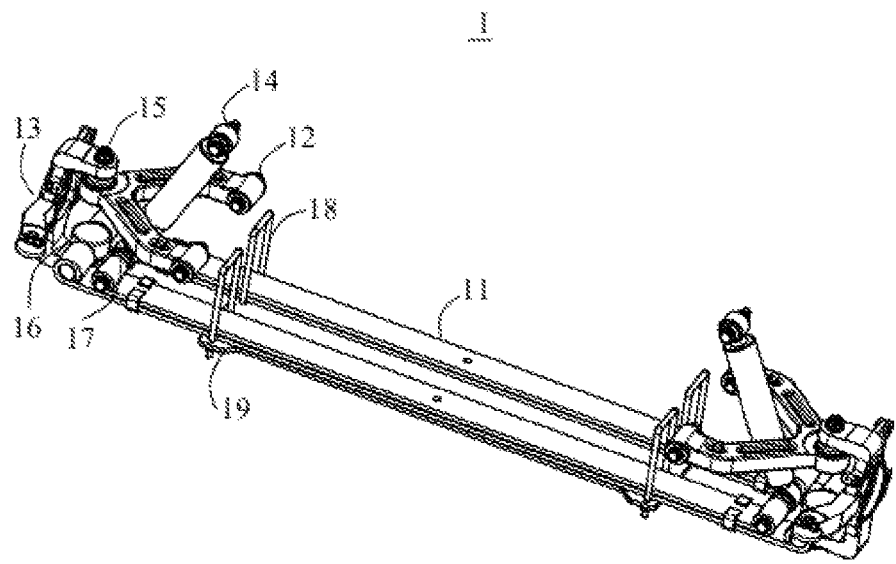
FIG. 1 is an axonometric diagram of a suspension structure disclosed in an embodiment of this application.

The accompanying drawings are not drawn to scale.

REFERENCE SIGNS

1—suspension structure; 11—leaf spring construction; 110—free end; 111—first mounting portion; 111a—first lifting eye; 112—second mounting portion; 112a—second lifting eye; 113—first leaf spring; 114—second leaf spring; 115—leaf spring connecting component; 12—upper arm; 13—steering knuckle; 14—shock absorber; 15—first connecting mechanism; 16—second connecting mechanism; 161—first ball joint mechanism; 161a—ball joint base; 161b—ball joint rod; 162—first shaft; 163—first fastening bolt; 17—third connecting mechanism; 171—second shaft; 172—second fastening bolt; 18—"U-shaped" bolt; and 19—reinforcement plate.

DESCRIPTION OF EMBODIMENTS

The following further describes the implementations of this application in detail with reference to the accompanying drawings and embodiments. The detailed description of embodiments and the accompanying drawings are intended to illustrate the principle of this application, rather than to limit the scope of this application, meaning this application is not limited to the embodiments described herein.

In the descriptions of this application, it should be noted that, unless otherwise stated, "plurality" means at least two; and the orientations or positional relationships indicated by the terms "upper", "lower", "left", "right", "inside", "outside", and the like are merely intended to help the description of this application and simplify the description without indicating or implying that the means or components must have specific orientations, or be constructed and manipulated with specific orientations, and therefore shall not be construed as limitations on this application. In addition, the terms "first", "second", "third", and the like are merely intended for description and shall not be understood as any indication or implication of relative importance. "Perpendicular" is not perpendicular in the strict sense but within an allowable range of error. "Parallel" is not parallel in the strict sense but within an allowable range of error.

In this specification, reference to "embodiment" means that specific features, structures, or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. Persons skilled in the art explicitly and implicitly understand that the embodiments described herein may be combined with other embodiments.

The term "and/or" in this specification is only an associative relationship for describing associated objects, indicating that three relationships may be present. For example, A and/or B may indicate three cases: presence of only A; presence of both A and B; and presence of only B. In addition, the character "/" in this specification generally indicates an "or" relationship between contextually associated objects.

In the embodiments of this application, the same reference signs denote the same components. For brevity, in different embodiments, detailed descriptions of the same components are not repeated. It should be understood that, as shown in the accompanying drawings, sizes such as thickness, length, and width of various components and sizes such as thickness, length, and width of integrated devices in the embodiments of this application are merely for illustrative purposes and should not constitute any limitations on this application.

The orientation terms appearing in the following description all refer to orientation as shown in the drawings and do not limit the specific structure of the application. In the description of this application, it should also be noted that unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

Currently, an existing suspension structure including one leaf spring construction is weak in connection strength and is easy to break under an external impact. In addition, a suspension structure including one leaf spring construction has poor stability, so a vehicle body is easy to shake when the vehicle jolts. In addition, the existing suspension structure is affected by a torque bias present at the shock absorber, which negatively impacts wheel steering and force transferring during the bouncing of the wheels, resulting in an unstable suspension structure.

In view of this, this application provides a suspension structure. The suspension structure includes a leaf spring assembly, a steering knuckle, a shock absorber, and an upper arm. The leaf spring assembly has two leaf spring constructions that can improve connection strength of the suspension structure, and each leaf spring construction is provided with two free ends to provide mounting space for the steering knuckle and the shock absorber, thereby increasing the utilization rate of the mounting space of the vehicle. In addition, the shock absorber is on a bouncing central line of wheels, providing a more significant shock absorption effect and effectively improving the stability of the suspension structure.

It should be noted that the suspension structure in this embodiment of this application is applicable to vehicles and other mechanical products. The vehicle may be an oil-fueled vehicle, a gas-powered vehicle, a new energy vehicle, a motorcycle, or the like. The new energy vehicle may be a battery electric vehicle, a hybrid electric vehicle, an extended-range electric vehicle, or the like. This application does not impose any specific limitations on the foregoing vehicles.

Figure 2:
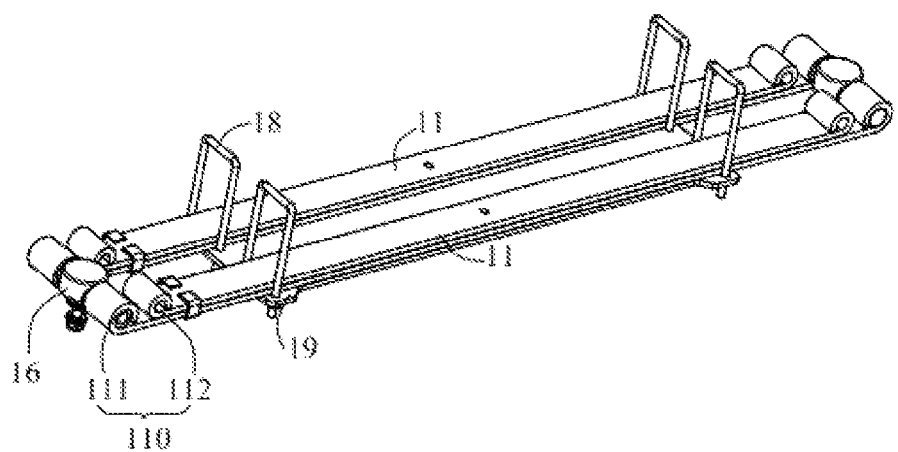
FIG. 2 is an explosive view of a structure of a suspension structure disclosed in an embodiment of this application.
Figure 3:
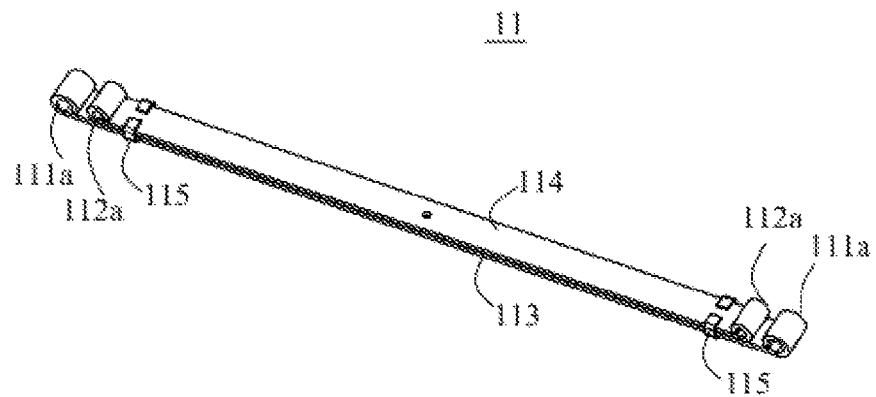
FIG. 3 is an axonometric diagram of a leaf spring construction disclosed in an embodiment of this application.

In a first aspect of this application, referring to FIG. 1, FIG. 2, and FIG. 3, an embodiment of this application discloses a suspension structure 1. The suspension structure 1 includes a leaf spring assembly, an upper arm 12, a steering knuckle 13, and a shock absorber 14. The leaf spring assembly includes two leaf spring constructions 11 arranged in a front-to-rear direction. Both leaf spring constructions 11 are arranged transversely relative to a body structure (not shown in FIG. 1), and the middle part of each leaf spring construction 11 is fixedly connected to the body structure. Each of the leaf spring constructions 11 is provided with two free ends 110 in a length direction, and each of the free ends 110 is provided with a first mounting portion 111 and a second mounting portion 112. One end of the upper arm 12 is rotatably connected to the body structure. An upper end of the steering knuckle 13 is connected to the other end of the upper arm 12 via a first connecting mechanism 15; and a lower end of the steering knuckle 13 is connected to the first mounting portions 111 of the two leaf spring constructions 11 via a second connecting mechanism 16. An upper end of the shock absorber 14 is connected to the body structure; and a lower end of the shock absorber 14 is connected to the second mounting portions 112 of the two leaf spring constructions 11 via a third connecting mechanism 17.

The suspension structure 1 is a general term for all force-transferring connection means between a chassis or a vehicle body and wheels of a vehicle, used to transfer forces and torques between the chassis or the vehicle body and wheels, buffer the impact load transferred from irregularities in a road surface to the chassis, and attenuate the vehicle body vibration caused by the road impact, so as to ensure smooth driving of the vehicle. The suspension structure 1 may include an elastic element, a guide mechanism, the shock absorber 14, and the like, and some also include a buffer block, a stabilizer bar, and the like. The elastic elements are typically springs, leaf springs, and the like, preferably leaf springs. The guiding mechanism typically includes the upper arm 12, a lower arm, the steering knuckle 13, and the like, configured to transfer forces and torques and act as a guide so that the trajectory of the wheels can be controlled during driving of the vehicle. The suspension structure 1 may include two leaf spring constructions 11 and provide mounting space for the steering knuckle 13 and the shock absorber 14 such that the shock absorber 14 is on a bouncing central line of wheels and no longer withstands the torque bias. This is a new type of structure.

The leaf spring assembly in this embodiment of this application includes two leaf spring constructions 11 arranged in a front-to-rear direction and other parts. The leaf spring construction 11 is a conventional elastic element and guide mechanism in the suspension structure 1 of the vehicle and can be used for transferring various forces and torques, having a friction damping effect to some extent. The leaf spring typically is a group of approximately equally strong spring beams formed by a combination of unequally long alloy spring steel pieces. In order to improve the connection strength of the leaf spring construction 11, the leaf spring construction 11 shown in FIG. 3 includes at least two leaf springs, including a first leaf spring 113 and a second leaf spring 114. "At least two" means more than two (including two), and the number of leaf springs is not limited in this embodiment of this application. For the leaf spring construction 11 in FIG. 3, several leaf springs decrease in length gradually from the bottom upwards, which is however not a limitation on embodiments of this application. The several leaf springs may alternatively increase in length gradually from the bottom upwards or overlap in different lengths. The leaf spring may be made of steel alloy or other materials. Leaf springs can be classified into four types by shape: oval leaf spring, semi-elliptical leaf spring, quarter-elliptical leaf spring, and flat leaf spring. All these four types of leaf springs are combinational leaf springs that rely on friction with the leaves to provide high buffering and shock absorption performance. The leaf spring shown in FIG. 3 is preferably a flat leaf spring without limiting embodiments of this application, and may instead be other types of leaf springs.

The upper arms 12 serve as both a guide and support of the suspension structure 1 of the vehicle and are symmetrically arranged on the left and right. Deformation of the upper arm can lead to improper wheel positioning and reduced driving stability. The upper arm 12 is mainly used to transfer torques, support steering knuckle arm, and dampen longitudinal load. Specifically, when the wheels bounce up and down, the upper arm 12 can swing along a specific trajectory, participating in constraining movement of the wheels and transferring the forces and torques acting on the vehicle in various directions due to uneven road surfaces. In the suspension structure 1, the upper arm 12 generally fits with the lower arm (not shown in the figure). When the suspension structure 1 bears a heavy load or encounters rough terrain, the deformation of the spring causes a change in the relative position between the vehicle body and the wheels. In order to ensure that the suspension structure 1 of the vehicle can meet use requirements, the upper arm 12 and the lower arm need to drive the wheel mounted on the steering knuckle 13 to rotate around the rotation center of the suspension structure 1. As shown in FIG. 1, the shock absorber 14 is between two fork arms of the upper arm 12, an end of the upper arm 12 is rotatably connected to the upper end of the steering knuckle 13, and the other end of the upper arm 12 is connected to the body structure. In addition, the upper arm 12 may be made by welding stamped steel plates together, precision casting high-strength ductile iron materials, or other manufacturing methods, which is not specifically limited in this embodiment of this application.

The steering knuckle 13 is a part of a steering knuckle assembly, and the steering knuckle assembly is formed by steering knuckles 13, a lower arm mounting portion, an upper arm mounting portion, and other components. The steering knuckles 13 are a guide mechanism in the suspension structure 1, symmetrically arranged on the left and right, and serve as hinges for wheel steering. They are also used for transferring forces and torques and act as a guide. The steering knuckle 13 has very high mechanical strength and fatigue durability. During driving of the vehicle, the steering knuckles 13 can withstand the wheel load and road impact, as well as random loads such as steering and braking, to ensure that the vehicle can travel safely and turn flexibly. In addition, as shown in FIG. 1, the steering knuckle 13 is generally fork-shaped, with its upper and lower forks having two coaxial holes for mounting a main pin and a trunnion for mounting a wheel. The steering knuckle 13 supports and drives the wheel to rotate around the main pin, so as to implement vehicle steering. Given the lightweight design of the steering knuckle 13, the lower arm mounting portion of the steering knuckle 13 may be connected to the first mounting portion 111 in the leaf spring construction 11 to reduce the vertical size of the steering knuckle 13, reducing weight of the steering knuckle 13. The upper arm mounting portion of the steering knuckle 13 is connected to the upper arm 12 and may be used to withstand some combined torques of bending and torsion, facilitating free steering of the wheels; and the steering knuckle 13 and the upper arm 12 are both symmetrically arranged between both sides of the suspension structure 1.

The shock absorber 14 is a part of a shock absorber assembly, and the shock absorber assembly is an assembly of shock absorbers 14, lower spring pads, dust sleeves, springs, shock absorber pads, upper spring pads, spring bases, bearings, top adhesives, nuts, and other components. The shock absorbers 14 are one of the important parts of the suspension structure 1, being symmetrically arranged on the left and right and mounted in parallel with the elastic element to jointly implement the function of impact cushioning and shock absorption. The shock absorber 14 is mainly used to suppress the impact from the road and the shock of a rebounded spring after absorbing shock, so as to counteract torsional vibration of a crankshaft. In terms of damping producing material, shock absorbers 14 are mainly divided into hydraulic and pneumatic types, and there are also variable-damping shock absorbers 14. In terms of structure, shock absorbers 14 are mainly divided into double-tube and single-tube types, and can be further divided into single-tube pneumatic shock absorbers, double-tube oleo shock absorbers, and double-tube oleo-pneumatic shock absorbers. For example, in order to better cushion the impact shock of the elastic element, the shock absorber 14 may be connected to the second mounting portion 112 of the leaf spring construction 11, being on the bouncing central line of the wheels, so that the shock absorber 14 under force can directly act on the bouncing center of the wheel to avoid the torque bias of the shock absorber 14.

The free ends 110 are action ends of the leaf spring construction 11 whose freedom is not all restricted and can be used to connect components such as the steering knuckle 13 and shock absorber 14. Given the need for mounting, as shown in FIG. 2, the leaf spring constructions 11 each are provided with two free ends 110, and each free end 110 is provided with the first mounting portion 111 and the second mounting portion 112. As is further understood, referring to FIG. 3, the leaf spring construction 11 includes the first leaf spring 113 and the second leaf spring 114, where the first leaf spring 113 is provided with two first free ends on two ends, and the second leaf spring 114 is provided with two second free ends on two ends, that is, the free end 110 includes a first free end and a second free end. The free end 110 and the leaf spring may be integrally formed or detachably connected, depending on the needs of an actual application scenario.

According to some embodiments in this application, the leaf spring assembly includes two leaf spring constructions 11 arranged in a front-to-rear direction, which improves the connection strength of the entire suspension structure 1, thereby increasing the load capacity of the vehicle. The shock absorber 14 is connected between the two leaf spring constructions 11 and arranged on a bouncing central line of wheels, so that the shock absorber 14 is under even force and effectively absorbs shocks, improving the stability of the suspension structure 1.

Refer to FIG. 3 to FIG. 6. According to this embodiment of this application, the first mounting portion 111 includes a first lifting eye 111a. The second connecting mechanism 16 includes a first shaft 162 and a first ball joint mechanism 161, and the first ball joint mechanism 161 connects the middle part of the first shaft 162 and the lower end of the steering knuckle 13.

The mounting portion is a part on the free end 110 of the leaf spring construction 11, configured for mounting the steering knuckle 13, the shock absorber 14, and other components. A leaf spring construction 11 includes two first mounting portions 111 and two second mounting portions 112. The mounting portion can withstand concentrated load and pressure, including but not limited to member forms of lifting eye, shaft eye, and tail eye, with a preferred member form being a lifting eye that can fit with connecting ends of components such as the steering knuckle 13 and shock absorber 14. Referring to FIG. 3, the first mounting portion 111 is preferably a first lifting eye 111a, and the second mounting portion 112 is preferably a second lifting eye 112a.

The lifting eye is a force-bearing component mounted on the leaf spring construction 11 for connection and is also an important connection part of the suspension structure 1. Two first lifting eyes 111a are disposed on the two first free ends of the first leaf spring 113; and two second lifting eyes 112a are disposed on the two second free ends of the second leaf spring 114. The first lifting eye 111a and the second lifting eye 112a have good bearing capacity and stability, are not easy to deform, and have strong corrosion resistance. Preferably, material of the lifting eye is the same as or similar to material of the leaf spring. The lifting eye may be integrally formed or detachably connected to the leaf spring; preferably, the first lifting eye 111a, the second lifting eye 112a, and the leaf spring are integrally formed, simplifying a manufacturing process of the leaf spring construction 11. The lifting eye may be circularly, elliptically, squarely, or prismatically curved, preferably, being circularly or elliptically curved with some accommodation space and freedom degree to fit the component connected.

Figure 5:
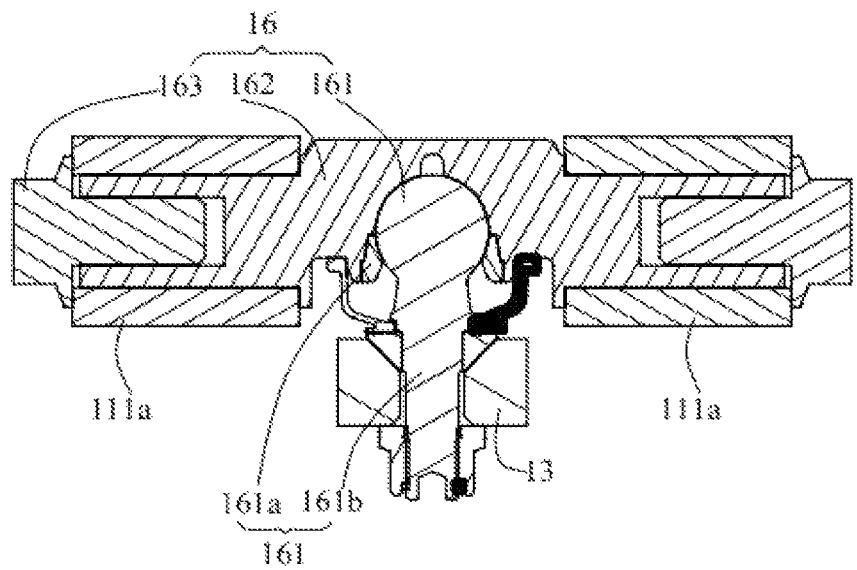
FIG. 5 is a sectional view of the suspension structure in FIG. 4 along A-A.
Figure 6:
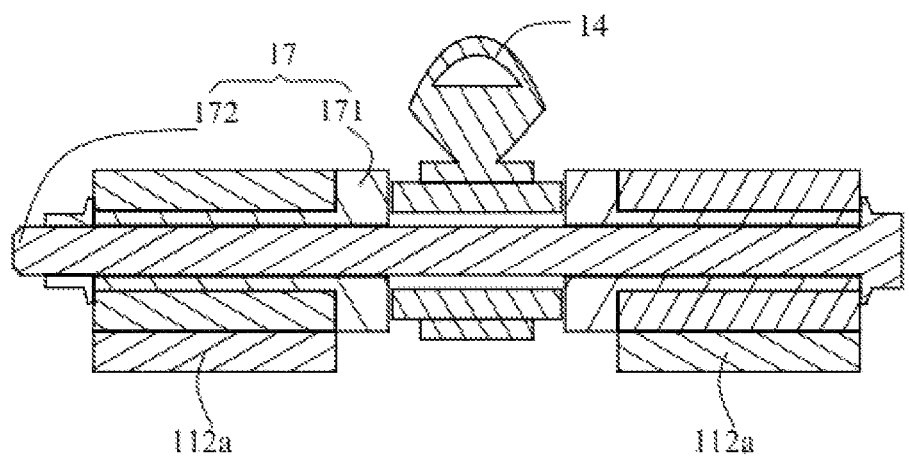
FIG. 6 is a sectional view of the suspension structure in FIG. 4 along B-B.

The connecting mechanism includes the first connecting mechanism 15, the second connecting mechanism 16, and the third connecting mechanism 17. The first connecting mechanism 15 is configured to connect the upper arm mounting portion of the steering knuckle 13 and the upper arm 12; and the second connecting mechanism 16 is configured to connect the lower arm mounting portion of the steering knuckle 13 and the leaf spring construction 11. The third connecting mechanism 17 is configured to connect the shock absorber 14 and the leaf spring construction 11 while connecting the suspension structure 1 and the body structure. As shown in FIG. 5, the second connecting mechanism 15 includes the first shaft 162, the first ball joint mechanism 161, and a first fastening bolt 163. The first fastening bolt 163 is configured to be placed into the first shaft 162 to fasten the second connecting mechanism 16 and limit movement of the second connecting mechanism 16, so as to prevent falling off. From a structural perspective, similar to the second connecting mechanism 16, the first connecting mechanism 15 also has a ball joint mechanism that fits with the first ball joint mechanism 161 to jointly implement guidance and rotation of the steering knuckle 13 and upper arm 12. This ensures the rotation function and also reduces the vertical size of the steering knuckle 13. Referring to FIG. 6, the third connecting mechanism 17 includes a second shaft 171 and a second fastening bolt 172. The second fastening bolt 172 is used to fasten the third connecting mechanism 17 to prevent the third connecting mechanism 17 from falling off.

According to some embodiment of this application, the first mounting portion 111 with a structural design of the first lifting eye 111a facilitates hinging with the first shaft 162 and implements rotatable connection with the steering knuckle 13. The first ball joint mechanism 161 can further expand the rotational range of the steering knuckle 13.

Refer to FIG. 3 to FIG. 6. According to this embodiment of this application, the second mounting portion 112 includes a second lifting eye 112a. The third connecting mechanism 17 includes the second shaft 171. Two ends of the second shaft 171 are hinged to the second lifting eyes 112a of the two leaf spring constructions 11, and the lower end of the shock absorber 14 is connected to the middle part of the second shaft 171.

Hinging means being connected using a hinge and is a movable connection method designed to provide a specific rotational capability to the hinged portion. Bearing hinges, butt hinges, ball hinges, and the like are all common hinges. The hinge is commonly used for connection of means or components of two parts of a machine, vehicle, door, window, and artifact, for example, in a specific application scenario of the suspension structure 1, bracket, or the like. In this embodiment of this application, the first connecting mechanism 15, the second connecting mechanism 16, and the third connecting mechanism 17 are all in a hinging manner to implement rotation. The first connecting mechanism 15 and the second connecting mechanism 16 are ball hinges and can move more flexibly; and the ball hinges of the two connecting mechanisms work with each other to jointly implement rotation and guiding of the steering knuckle 13.

The shaft is a shaft required for connecting main parts of a product, and is configured to withstand bending and torques during working. The shaft has high strength and corrosion resistance, so as to prevent breaking during connection. As shown in FIG. 5 and FIG. 6, the shaft includes a first shaft 162 and a second shaft 171. The first shaft 162 is an important part of the second connecting mechanism 16. Two ends of the first shaft 162 are directly connected to the first lifting eye 111a, and the two ends are fastened by inserting the first fastening bolt 163, so as to prevent the first shaft 162 from falling off the first lifting eye 111a. The middle part of the first shaft 162 has some accommodating space and is connected to the first ball joint mechanism 161 to limit the movement of the first ball joint mechanism 161 within a range of the middle part of the first shaft 162. The second shaft 171 is an important part in the third connecting mechanism 17. The two ends of the second shaft 171 are directly connected to the second lifting eye 112a, the middle part of the second shaft 171 is connected to the shock absorber 14, and the second shaft 171 is confined to the second lifting eye 112a by the second fastening bolt 172.

According to this embodiment of this application, the second mounting portion 112 with a structural design of the second lifting eye 112a facilitates hinging with the second shaft 171 and implements rotatable with the shock absorber 14 is rotatable. The shock absorber 14 is connected to the middle part of the second shaft 171, so that the shock absorber 14 is located on the bouncing central line of wheels.

Figure 7:
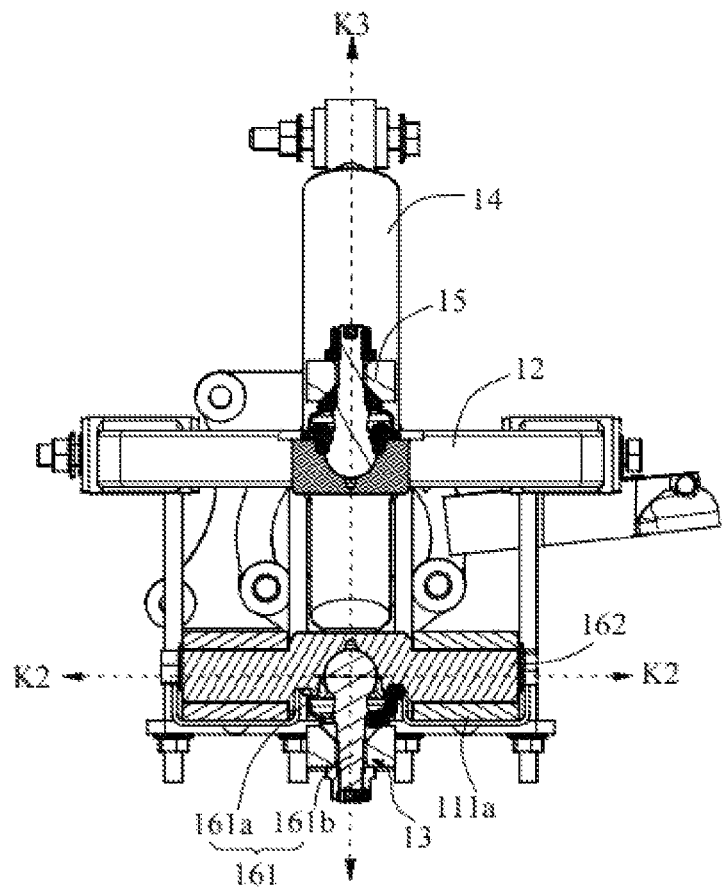
FIG. 7 is a left view of a suspension structure disclosed in an embodiment of this application.

Refer to FIG. 7. According to this embodiment of this application, the first ball joint mechanism 161 includes a ball joint base 161a and a ball joint rod 161b. The ball joint base 161a is disposed at the middle part of the first shaft 162, the ball joint rod 161b rotatably fits with the ball joint base 161a, and the ball joint rod 161b is connected to the lower arm mounting portion at the lower end of the steering knuckle 13.

The ball joint base 161a is an important part of a steering ball joint assembly of the vehicle and is an important part of a steering system of the vehicle. The ball joint base 161a fits with the ball joint rod 161b, and is a load-bearing concentrated zone. A surface sectional view of the ball joint base 161a is circularly curved with a spherical cavity for accommodating a ball joint portion of the ball joint rod 161b. The ball joint rod 161b includes a rod portion and the ball joint portion, where the ball joint portion can be fitted to the ball joint base. A ball joint end of the first ball joint mechanism 161 is disposed inside the internal cavity of the first shaft 162, and is configured to implement the rotation function of the first ball joint mechanism 161. Referring to FIG. 7, the ball joint rod 161b is an acting end of the first ball joint mechanism 161 and is connected to the lower arm mounting portion at the lower end of the steering knuckle 13. The first connecting mechanism 15 is also provided with a ball joint mechanism, and the ball joint mechanism also includes a ball joint base 161a and a ball joint rod 161b and is configured to connect the upper arm 12 with the upper arm mounting portion of the steering knuckle 13.

According to this embodiment of this application, the first ball joint mechanism 161 enables the steering knuckle 13 to move up and down along with the leaf spring constructions 11 and to rotate relative to the leaf spring constructions 11.

Refer to FIG. 7. According to this embodiment of this application, a ball center of the ball joint rod 161b is on an axis of the first shaft 162.

The ball center of the ball joint rod 161b is the center of the ball joint in the ball joint rod 161b. As shown in FIG. 7, K2 is an axis in the horizontal direction of the first shaft 162, K3 is another axis (central line) in the vertical direction of the first shaft 162, and the intersection of the two axes K2 and K3 is the ball center of the ball joint rod 161b. Because the first ball joint mechanism 161 is directly connected to the steering knuckle 13, the ball center of the ball joint rod 161b is on the axis of the first shaft 162, which can reduce the vertical size of the steering knuckle 13.

According to this embodiment of this application, the ball center of the ball joint rod 161b is on the axis of the first shaft 162. This not only ensures a rotation function of the first ball joint mechanism 161, but also helps reduce the size of the steering knuckle 13 in a vertical direction and reduce weight of the steering knuckle 13, implementing a lightweight design of the steering knuckle 13.

Figure 4:
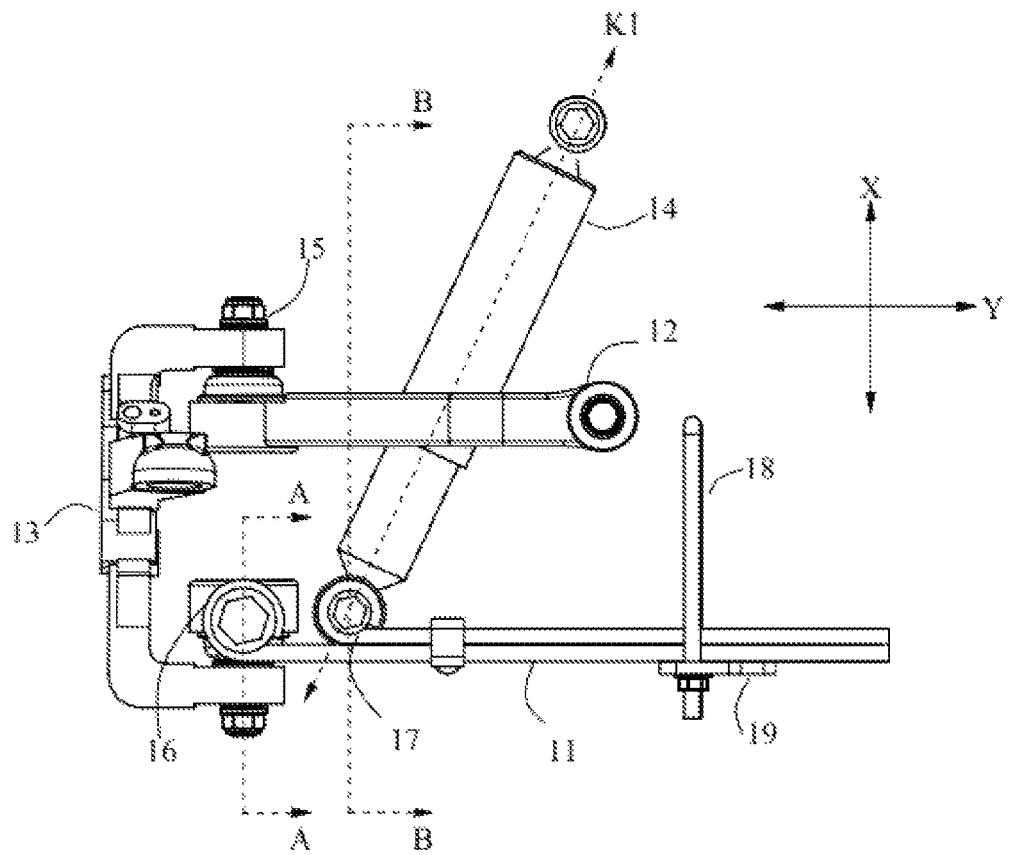
FIG. 4 is a front view of a local structure of a suspension structure disclosed in an embodiment of this application.
Figure 8:
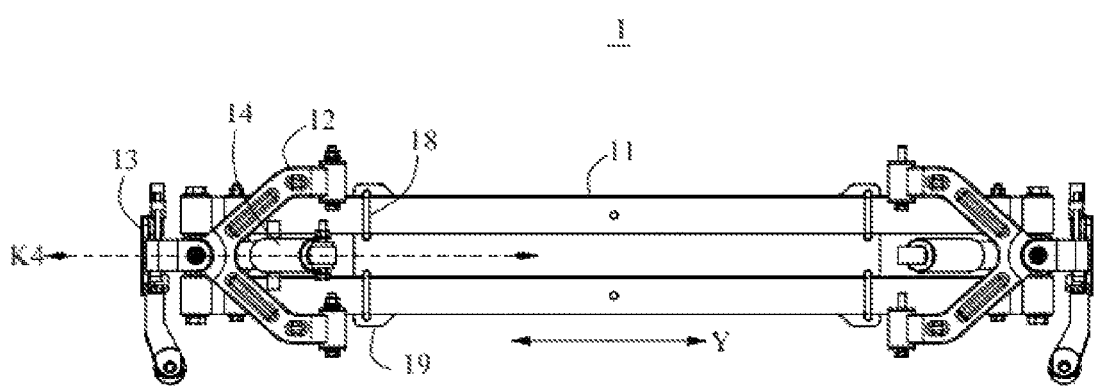
FIG. 8 is a top view of a suspension structure disclosed in an embodiment of this application.

Refer to FIG. 4 and FIG. 8. According to this embodiment of this application, the leaf spring constructions 11 are disposed symmetrically with respect to an intermediate plane, and the axis of the shock absorber 14 is on the intermediate plane.

An axis refers to a straight line around which an object or a three-dimensional graph rotates or conceivably rotates, and may also be referred to as a central axis or center line. As shown in FIG. 4, line K1 is an axis of the shock absorber 14, and the shock absorber 14 performs telescopic damping motion along line K1. As shown in FIG. 8, line K4 is a line parallel to a length direction Y of the leaf spring construction 11, and line K4 and line K1 are on the same plane, namely, the intermediate plane in this embodiment of this application; and the leaf spring constructions 11 are symmetrically disposed with respect to the intermediate plane.

According to some embodiments in this application, when the shock absorber 14 is under force, it can directly act on the bouncing center of the wheels, resulting in a more significant shock absorption effect. This also prevents the shock absorber 14 from withstanding torque bias, reducing wear of the shock absorber 14 and prolonging service life of the shock absorber 14.

Refer to FIG. 3. According to this embodiment of this application, the leaf spring assembly also includes a U-shaped bolt 18 configured to connect the middle part of the leaf spring construction 11 to the body structure.

The U-shaped bolt 18, also known as a saddle bolt, has a wide range of applications and has threads at both ends that can be combined with a nut (not shown in the figure). It is commonly used to fix the middle of the leaf spring construction 11 in the suspension structure 1 to the body structure of the vehicle.

According to some embodiments in this application, the "U-shaped" bolt 18 has a simple and lightweight structure that makes it easy to fasten the leaf spring construction 11.

Refer to FIG. 3. According to some embodiments in this application, the leaf spring assembly further includes a reinforcement plate 19. The reinforcement plate 19 is disposed under two leaf spring constructions 11 and is configured to support the two leaf spring constructions 11. The reinforcement plate 19 is connected to the body structure via the "U-shaped" bolt 18.

The reinforcement plate 19 is used to connect the front and rear leaf spring constructions 11 together. The reinforcement plate 19 fits with the "U-shaped" bolt 18 to connect the entire leaf spring assembly to the body structure of the vehicle. The reinforcement plate 19 may be plate-shaped or in another shape and may be made of a high strength material such as stainless steel and is not easy to deform.

According to some embodiments in this application, the reinforcement plate 19 can increase the connection strength and the stability of the leaf spring assembly, further increasing a load capacity of the suspension structure 1. The reinforcement plate 19 fits with the "U-shaped" bolt 18, implementing a tighter connection between the leaf spring assembly and the body structure.

Refer to FIG. 2 to FIG. 4. According to this embodiment of this application, the leaf spring construction 11 includes at least two leaf springs, a leaf spring connecting component 115, two first mounting portions 111, and two second mounting portions 112. The at least two leaf springs are stacked along a vertical direction; and the at least two leaf springs decrease in length gradually from the bottom upwards. The at least two leaf springs include a first leaf spring 113 and a second leaf spring 114, where length of the first leaf spring 113 is greater than length of the second leaf spring 114. The leaf spring connecting component 115 is configured to fixedly connect body portions of the at least two leaf springs in the length direction. The two first mounting portions 111 are respectively disposed on two first free ends of the first leaf spring 113 in the length direction. The two second mounting portions 112 are respectively disposed on two second free ends of the second leaf spring 114 in the length direction.

The leaf spring connecting component 115 is used for fixedly connecting the body portions of at least two of the leaf springs in the leaf spring construction 11 together. The connecting component generally includes a locking fastener and a stopper and may adopt a detachable connection such as bolting and snapping, a connection through welding or riveting, or an integral formation through stamping or the like. The leaf spring connecting component 115 is in a detachable connection manner in most cases. The bolting connection may be implemented by a combination of a nut and a bolt and is a type of connection through which two or more parts or components are bolted together as a whole. Specifically, the component for bolting connection can fix the body portions of all the leaf springs in the leaf spring construction 11. The snap connection may be a combination of a snap and a restraint block, or uses a component such as a snap spring or snap ring to limit the movement of the leaf spring.

The "length direction" is a direction along the length of the leaf spring relative to the leaf spring itself; and referring to FIG. 4, the "length direction" is the direction Y. As shown in FIG. 2, two first mounting portions 111 and two second mounting portions 112 are provided at the leaf spring construction 11 along the length direction of the leaf spring. In addition, the "vertical direction" is a direction perpendicular to the horizontal plane when the leaf spring construction 11 is placed parallel to the horizontal plane, or a direction perpendicular to the length direction of the leaf spring construction 11, that is, the direction X in FIG. 4. In the vertical direction of the leaf spring, at least two of the leaf springs are stacked. "Stacking" is overlapping and superimposing of the at least two leaf springs; preferably, stacking is made in the vertical direction from bottom upwards, with the at least two leaf springs gradually decreasing in length.

According to some embodiments in this application, the leaf spring construction 11 includes at least two leaf springs, which improves the connection strength and durability of the leaf spring construction 11 and prolongs service life of the leaf spring construction 11. The first leaf spring 113 and the second leaf spring 114 each are provided with two mounting portions, which can provide mounting space for the steering knuckle 13 and the shock absorber 14, thereby improving utilization of the mounting space of the vehicle.

Refer to FIG. 4, according to this embodiment of this application, the first leaf spring 113 is provided at the lowest part of the leaf spring construction 11.

The "lowest part" is the part at the bottom of the leaf springs stacked in the vertical direction relative to the leaf spring construction 11. It can be understood that the first leaf spring 113 is the one at the bottom of the leaf springs in the vertical direction. In addition, the leaf springs gradually decrease in length along the vertical direction from the bottom upwards, so the first leaf spring 113 at the bottom should be the longest leaf spring.

According to this embodiment of this application, the first leaf spring 113 is disposed at the lowest part of the leaf spring construction 11, facilitating the arrangement of two first mounting portions 111 at two first free ends of the first leaf spring 113 in the length direction and allowing the first leaf spring 113 to support from the lowest part other leaf springs and other components.

Refer to FIG. 4. According to this embodiment of this application, the second leaf spring 114 is above the first leaf spring 113.

"Above" is a direction opposite to "below" in the vertical direction. The first leaf spring 113 is at the lowest part of the leaf spring construction 11, the other leaf springs are above the first leaf spring 113, and the second leaf spring 114 is also above the first leaf spring 113. In addition, the lengths of the leaf springs gradually decrease from the bottom upwards, so that the length of the second leaf spring 114 is less than the length of the first leaf spring 113.

According to this embodiment of this application, the second leaf spring 114 being disposed above the first leaf spring 113 facilitates disposition of two second mounting portions 112 on the two second free ends of the second leaf spring 114.

Refer to FIG. 4. According to this embodiment of this application, the second leaf spring 114 and the first leaf spring 113 are adjacent or spaced apart.

"Adjacent or spaced apart" means that along the vertical direction, the second leaf spring 114 is above the first leaf spring 113, either being adjacent with an upper end surface of the first leaf spring 113 in contact with a lower end surface of the second leaf spring 114, or being spaced apart with at least one leaf spring being sandwiched between the second leaf spring 114 and the first leaf spring 113. This is not limited in embodiments of this application.

According to this embodiment of this application, the second leaf spring 114 and the first leaf spring 113 are adjacent or spaced apart, so that a distance between the two first free ends and the two second free ends in the vertical direction can be flexibly adjusted, thereby more flexibly satisfying a mounting space requirement for the steering knuckle 13, the shock absorber 14, and other components.

Refer to FIG. 4. According to an embodiment of this application, the two second mounting portions 112 are located between the two first mounting portions 111.

According to this embodiment of this application, the two second mounting portions 112 are located between the two first mounting portions 111, so that the first mounting portions 111 and the second mounting portions 112 can be staggered in positional from each other to avoid interference between connecting components during the mounting, facilitating the mounting of the steering knuckle 13, the shock absorber 14 or other parts.

Figure 9:
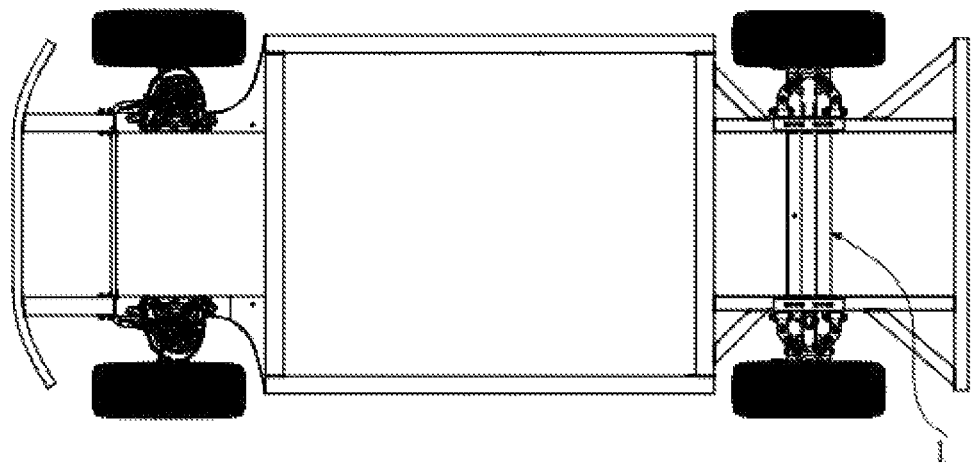
FIG. 9 is a schematic diagram of a structure of a vehicle disclosed in an embodiment in a second aspect of this application.

According to a second aspect of this application, referring to FIG. 9, an embodiment of this application discloses a vehicle including all of the above suspension structures 1.

According to this embodiment of this application, for the vehicle in this application, on the one hand, connection strength and stability of the suspension structure 1 of the vehicle can be significantly improved; on the other hand, a steering knuckle 13 and a shock absorber 14 in the vehicle are disposed between two leaf spring constructions 11, which can reduce the number of connected components and facilitate steering of wheels, providing a more significant shock absorption effect.

Refer to FIG. 9. According to this embodiment of this application, the body structure is a vehicle body and/or a sub-chassis.

According to some embodiments in this application, the body structure is a vehicle body and/or a sub-chassis connected to the suspension structure 1 in this application, which can enhance stability and comfort of the vehicle, and reduce wear of the shock absorber 14 to improve reliability and prolong service life of the vehicle.

Although this application has been described with reference to some preferred embodiments, various modifications to this application and replacements of the components therein with equivalents can be made without departing from the scope of this application. In particular, as long as there is no structural conflict, the various technical features mentioned in the embodiments can be combined in any form. This application is not limited to the specific embodiments disclosed in this specification but includes all technical solutions falling within the scope of the claims.

The invention claimed is:

1. A suspension structure, comprising:
   a leaf spring assembly, comprising two leaf spring constructions arranged in a front-to-rear direction, wherein both leaf spring constructions are arranged transversely relative to a body structure, and a middle part of each leaf spring construction is fixedly connected to the body structure; and each of the leaf spring constructions is provided with two free ends in a length direction, and each of the free ends is provided with a first mounting portion and a second mounting portion;
   an upper arm, wherein one end of the upper arm is rotatably connected to the body structure;
   a steering knuckle, wherein an upper end of the steering knuckle is connected to the other end of the upper arm via a first connecting mechanism; and a lower end of the steering knuckle is connected to the first mounting portions of the two leaf spring constructions via a second connecting mechanism; and
   a shock absorber, wherein an upper end of the shock absorber is connected to the body structure; and a lower end of the shock absorber is connected to the second mounting portions of the two leaf spring constructions via a third connecting mechanism.

2. The suspension structure according to claim 1, wherein the first mounting portion comprises a first lifting eye; and
   the second connecting mechanism comprises a first shaft and a first ball joint mechanism, wherein
   two ends of the first shaft are hinged to the first lifting eyes of the two leaf spring constructions; and
   the first ball joint mechanism is connected to the middle part of the first shaft and the lower end of the steering knuckle.

3. The suspension structure according to claim 1, wherein the second mounting portion comprises a second lifting eye; and
   the third connecting mechanism comprises a second shaft; two ends of the second shaft are hinged to the second lifting eyes of the two leaf spring constructions; and
   the lower end of the shock absorber is connected to the middle part of the second shaft.

4. The suspension structure according to claim 2, wherein the first ball joint mechanism comprises a ball joint base and a ball joint rod, wherein the ball joint base is disposed at the middle part of the first shaft, the ball joint rod rotatably fits with the ball joint base, and the ball joint rod is connected to the lower end of the steering knuckle.

5. The suspension structure according to claim 4, wherein a ball center of the ball joint rod is on an axis of the first shaft.

6. The suspension structure according to claim 1, wherein the two leaf spring constructions are provided symmetrically with respect to an intermediate plane, and an axis of the shock absorber is located on the intermediate plane.

7. The suspension structure according to claim 2, wherein the leaf spring assembly further comprises a "U-shaped" bolt configured to connect the middle part of the leaf spring construction to the body structure.

8. The suspension structure according to claim 7, wherein the leaf spring assembly further comprises a reinforcement plate, wherein the reinforcement plate is disposed under the two leaf spring constructions and is configured to support the two leaf spring constructions; and the reinforcement plate is connected to the body structure via the "U-shaped" bolt.

9. The suspension structure according to claim 1, wherein the leaf spring construction comprises:
   at least two leaf springs, wherein the at least two leaf springs are stacked along a vertical direction; the at least two leaf springs decrease in length gradually from the bottom upwards; the at least two leaf springs comprise a first leaf spring and a second leaf spring; and length of the first leaf spring is greater than length of the second leaf spring;
   a leaf spring connecting component, configured to fixedly connect body portions of the at least two leaf springs in the length direction;
   two first mounting portions, respectively disposed on two first free ends of the first leaf spring in the length direction; and
   two second mounting portions, respectively disposed on two second free ends of the second leaf spring in the length direction.

10. The suspension structure according to claim 9, wherein the first leaf spring is disposed at the lowest part of the leaf spring construction.

11. The suspension structure according to claim 9, wherein the second leaf spring is located above the first leaf spring.

12. The suspension structure according to claim 11, wherein the second leaf spring and the first leaf spring are adjacent or spaced apart.

13. The suspension structure according to claim 9, wherein in the length direction, the two second mounting portions are located between the two first mounting portions.

14. A vehicle, wherein the vehicle comprises the suspension structure according to any claim 1.

15. The vehicle according to claim 14, wherein the body structure is a vehicle body and/or a sub-chassis.

* * * * *